(12) United States Patent
Yamashita et al.

(10) Patent No.: US 6,498,670 B2
(45) Date of Patent: Dec. 24, 2002

(54) OPTICAL RECEIVING APPARATUS AND METHOD

(75) Inventors: Katsuya Yamashita, Kawasaki (JP); Takeshi Ihara, Kawasaki (JP); Hiroshi Hamano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/119,595

(22) Filed: Jul. 21, 1998

(65) Prior Publication Data

US 2002/0067532 A1 Jun. 6, 2002

(30) Foreign Application Priority Data

Mar. 19, 1998 (JP) .............................. 10-069694

(51) Int. Cl.[7] .............................................. H04B 10/06
(52) U.S. Cl. ......................... 359/189; 359/194; 359/158
(58) Field of Search ................................. 359/189, 194, 359/191, 180, 187, 158; 379/93.01–93.37

(56) References Cited

U.S. PATENT DOCUMENTS

| 4,606,044 A | * | 8/1986 | Kudo | .............................. 379/6 |
| 4,694,504 A | * | 9/1987 | Porter et al. | .................. 359/194 |
| 5,164,685 A | * | 11/1992 | Niemio | ............................ 331/8 |
| 5,557,445 A | * | 9/1996 | Misaizu | ........................ 359/187 |
| 5,864,416 A | * | 1/1999 | Williams | ...................... 359/189 |

FOREIGN PATENT DOCUMENTS

| JP | 5-102996 | 4/1993 |
| JP | 6-232711 | 8/1994 |

* cited by examiner

*Primary Examiner*—Jason Chan
*Assistant Examiner*—Christina Y Leung
(74) *Attorney, Agent, or Firm*—Staas & Halsey LLP

(57) ABSTRACT

It is aimed at providing an optical receiving apparatus and an optical receiving method, which can assuredly receive and process signal lights having different transmission rates, by a simple and single device. To this end, the signal light received by the present optical receiving apparatus is converted into an electric signal by a light receiving element and thereafter sent to an equalizing amplifier whereby the signal is amplified. The transmission rate of this received signal is detected by a transmission rate detecting part, and a band of the equalizing amplifier is optimally controlled by an equalizing band controlling part, corresponding to the detected transmission rate. In case of adopting a PLL (phase-locked loop) circuit as a clock generating circuit, there is also controlled a band of a loop filter corresponding to the transmission rate detected by the transmission rate detecting part. Thus, there can be obtained an excellent reception characteristics, even when receiving signal lights having different transmission rates.

10 Claims, 7 Drawing Sheets

OPTICAL RECEIVING APPARATUS AND METHOD

BACKGROUND OF THE INVENTION (1) Field of the Invention

The present invention relates to an optical receiving apparatus and an optical receiving method for constituting an optical transmission system, and particularly, to an optical receiving apparatus and an optical receiving method for receiving and processing signal lights having different transmission rates.

(2) Prior Art

In a conventional optical transmission system, there have been adopted optical receiving apparatuses which are matched with the transmission rates of the signal lights, respectively. Concretely, there have been adopted dedicated optical receiving apparatuses which are adapted such as to 622 Mb/s, 2.5 Gb/s, and 10 Gb/s, respectively, which are the transmission rates in an SDH (Synchronous Digital Hierarchy) system.

In such a conventional optical receiving apparatus, each of the received signal lights is converted into an electric signal such as by means of a light receiving element, and linearly amplified such as by an equalizing amplifier. Then, such as discrimination processing is effected for the received data, making use of a clock signal which is regenerated based on the amplified signal. To accurately effect the reception processing, there have been separately established such as the equalizing band of the equalizing amplifier and the filter band of the clock signal regeneration system, corresponding to each of the transmission rates of the signal lights. Thus, it has been necessary to provide a dedicated optical receiving apparatus for each of the transmission rates of the signal lights.

Meanwhile, in a wavelength-division multiplexing (WDM) type of network in which a plurality of signal lights having different wavelengths are transmitted within a single optical fiber, the transmission rate of each of lights may differ from one another depending on the wavelength. Then, it is demanded to receive each of such signal lights having different transmission rates by an optical receiving apparatus, with flexibility. To realize that, it becomes necessary that the optical receiving apparatus itself is provided with a function to automatically detect the transmission rate and to switch its operation based on the detected transmission rate, differently from the conventional technique where the optical receiving apparatuses are exchanged for each of the transmission rates, respectively. In this case, to optimize the reception characteristics of the optical receiving apparatus, it is desired to optimally control such as the equalizing band of the equalizing amplifier and the filter band of the clock signal regeneration system, corresponding to the detected transmission rate.

Regarding an equalizing amplifier, there occurs such a problem when its equalizing band is fixed at constant, as follows. In case that a signal at a rate higher than the equalizing band is received, the waveform is distorted due to band limitation exerting onto the signal output from the equalizing amplifier, thereby deteriorating the reception characteristics. In another case that a signal at a rate lower than the equalizing band is received, there is increased a high-frequency noise component at the equalizing amplifier, thereby also deteriorating the reception characteristics. To avoid such deterioration of the reception characteristics, it is necessary to control the equalizing band corresponding to the transmission rate of the signal light.

However, the conventional optical receiving apparatuses do not have a function to optimally control such as the equalizing band, by detecting the transmission rate of the received signal. Thus, in case of applying the optical receiving apparatus to the network of the aforementioned wavelength-division multiplexing system, it is required to provide an optical receiving apparatus for each of the transmission rates, causing a problem that the constitution is complicated, with higher cost.

As a conventional technique for detecting the transmission rate of a received signal, there is known such as Japanese Unexamined Patent Publication No.5-102996. In this conventional technique, there is measured the number of shifting points of received data within a fixed period of time, and it is judged as to whether the measured number of the shifting points is in of a normal range or an abnormal range, to thereby detect a change of the transmission rate of received signal. If this technique is applied to the aforementioned conventional optical receiving apparatus, it becomes possible to detect the change of the transmission rate of the received signal light. However, there cannot be obtained optimal reception characteristics corresponding to the transmission rate. Further, in case of detecting the transmission rate making use of an output such as of the equalizing amplifier of the conventional optical receiving apparatus, there exists such a problem that the change of the transmission rate cannot be detected accurately when a signal light at a rate higher than the equalizing band is received.

SUMMARY OF THE INVENTION

The present invention has been carried out in view of the conventional problems as described above, and it is therefore an object of the present invention to provide an optical receiving apparatus and an optical receiving method in which signal lights having different transmission rates can be assuredly received and processed with a simple constitution.

Thus, the optical receiving apparatus according to the present invention comprises: a light receiving element for receiving each of signal lights having different transmission rates and for converting the received signal light into an electric signal; an equalizing-amplifying device having a variable band, for linearly amplifying the electric signal from the light receiving element; a transmission rate detecting device for detecting a transmission rate of the received signal light; and an equalizing-amplification controlling device for controlling the band of the equalizing-amplifying device, corresponding to the transmission rate which is detected by the transmission rate detecting device.

According to such a constitution, the signal light received in the present optical receiving apparatus is firstly converted into an electrical signal by the light receiving element, and then sent to the equalizing-amplifying device where the converted signal is linearly amplified. At this time, the band of equalizing-amplifying device is controlled by the equalizing-amplification controlling device, corresponding to the transmission rate detected by the transmission rate detecting device, thereby avoiding deterioration of the reception characteristics even when the transmission rate of the received signal light is changed.

Therefore, it becomes possible to receive and process signal lights having different transmission rates by a single optical receiving apparatus, thereby dealing with such as wavelength-division multiplexing type of network with flexibility, while reducing cost of the optical transmission system.

Preferably, the equalizing-amplification controlling device comprises a device for controlling the band of the equalizing-amplifying device to be a maximum, when received a rate-change signal indicating that the transmission rate of the received signal light has been changed; and a device for, on and after the transmission rate after changing has been detected by the transmission rate detecting device, controlling the band of the equalizing-amplifying device to be an optimal value corresponding to the detected transmission rate.

Thus, the band of the equalizing-amplifying device is controlled to be a maximum at the time of change of transmission rate, so that the received signal is not distorted by band limitation of the equalizing-amplifying device even when the transmission rate is changed from a lower rate toward a higher rate. Further, the band of the equalizing-amplifying device is controlled to be an optimal value corresponding to the detected transmission rate when the transmission rate after changing is detected by the transmission rate detecting device, thereby obtaining excellent reception characteristics. Therefore, the signal lights having different transmission rates can be received and processed with accuracy.

The aforementioned optical receiving apparatus may be constituted to further comprise a clock regenerating device for regenerating a clock signal based on a signal from the equalizing-amplifying device, making use of a phase-locked loop circuit having a loop filter having a variable band; and a clock regeneration controlling device for controlling a band of the loop filter corresponding to the transmission rate detected by the transmission rate detecting device.

According to such a constitution, there is regenerated a clock signal by the clock regenerating device making use of a phase-locked loop circuit, based on a signal from the equalizing-amplifying device. At this time, the band of loop filter constituting the phase-locked loop circuit is controlled by the clock regeneration controlling device corresponding to the transmission rate detected by the transmission rate detecting device, so that a stable clock signal can be obtained even when the transmission rate of the received signal is shifted.

Preferably, the clock regeneration controlling device comprises a device for controlling the band of the loop filter to be a maximum, when received a rate-change signal indicating that the transmission rate of the received signal light has been changed; and a device for, on and after the transmission rate after changing has been detected by the transmission rate detecting device, controlling the band of the loop filter to be an optimal value corresponding to the detected transmission rate.

Thus, the band of the loop filter is controlled to be a maximum at the time of change of the transmission rate, so that the pull-in time of the phase-locked loop circuit is shortened. Further, when the transmission rate after changing is detected by the transmission rate detecting device, the band of the loop filter is optimized corresponding to the thus detected transmission rate, so that Q of the clock signal is kept substantially constant thereby regenerating a stable clock signal.

Further, the phase-locked loop circuit may include a voltage controlled oscillating part which is capable of generating oscillation signals at frequencies corresponding to different transmission rates, respectively, and the clock regeneration controlling device may comprise a device for controlling the oscillation frequency of the voltage controlled oscillating part, in a manner corresponding to the transmission rate detected by the transmission rate detecting device.

Thus, there can be output, from the voltage controlled oscillating part, a clock signal corresponding to each of the different transmission rates, so that the constitution of the clock regenerating device can be simplified.

In addition, the rate-change signal can be generated based on either of: halting of the reception of signal light; change of the output of the transmission rate detecting device; or a code error or outing of synchronism in a discrimination processing of the received signal.

As a concrete constitution of the transmission rate detecting device, it is preferable that the transmission rate detecting device comprises a filtering part for receiving, as an input signal, a signal from the equalizing-amplifying device, the filtering part having a band narrower than the minimum band of the equalizing-amplifying device, a rectifying part for rectifying a signal passed through the filtering part, and an averaging part for obtaining an averaged value of level of a signal rectified by the rectifying part, and for detecting a transmission rate of the received signal light, based on the averaged value.

According to such a constitution, it becomes possible to assuredly detect the transmission rate without being affected by the band change of the equalizing-amplifying device, even when the transmission rate detecting device detects the transmission rate based on the signal from the equalizing-amplifying device.

An optical receiving method according to the present invention comprises the steps of: receiving each of signal light having different transmission rates and converting the received signal light into an electric signal; detecting a transmission rate of the received signal light; and equalizing-amplification-controlling a variable band of equalizing-amplifying device which linearly amplifies the converted electric signal. Further, the equalizing-amplification-controlling step preferably comprises the steps of: controlling the band of the equalizing-amplifying device to be a maximum, when the transmission rate of the received signal light has been changed; and, on and after the transmission rate after changing has been detected, controlling the band of the equalizing-amplifying device to be an optimal value corresponding to the detected transmission rate.

The optical receiving method may further comprise the steps of: regenerating a clock signal based on the signal linearly amplified by the equalizing-amplifying device, making use of a phase-locked loop circuit having a loop filter having a variable band; and controlling a band of the loop filter corresponding to the detected transmission rate.

Further objects, features and advantages of the present invention will become more apparent from the following description of preferred embodiments when read in conjunction with the accompanying drawings.

DETAILED DESCRIPTION OF THE INVENTION

There will be described hereinafter the embodiments of the present invention, with reference to the accompanying drawings.

Figure 1:
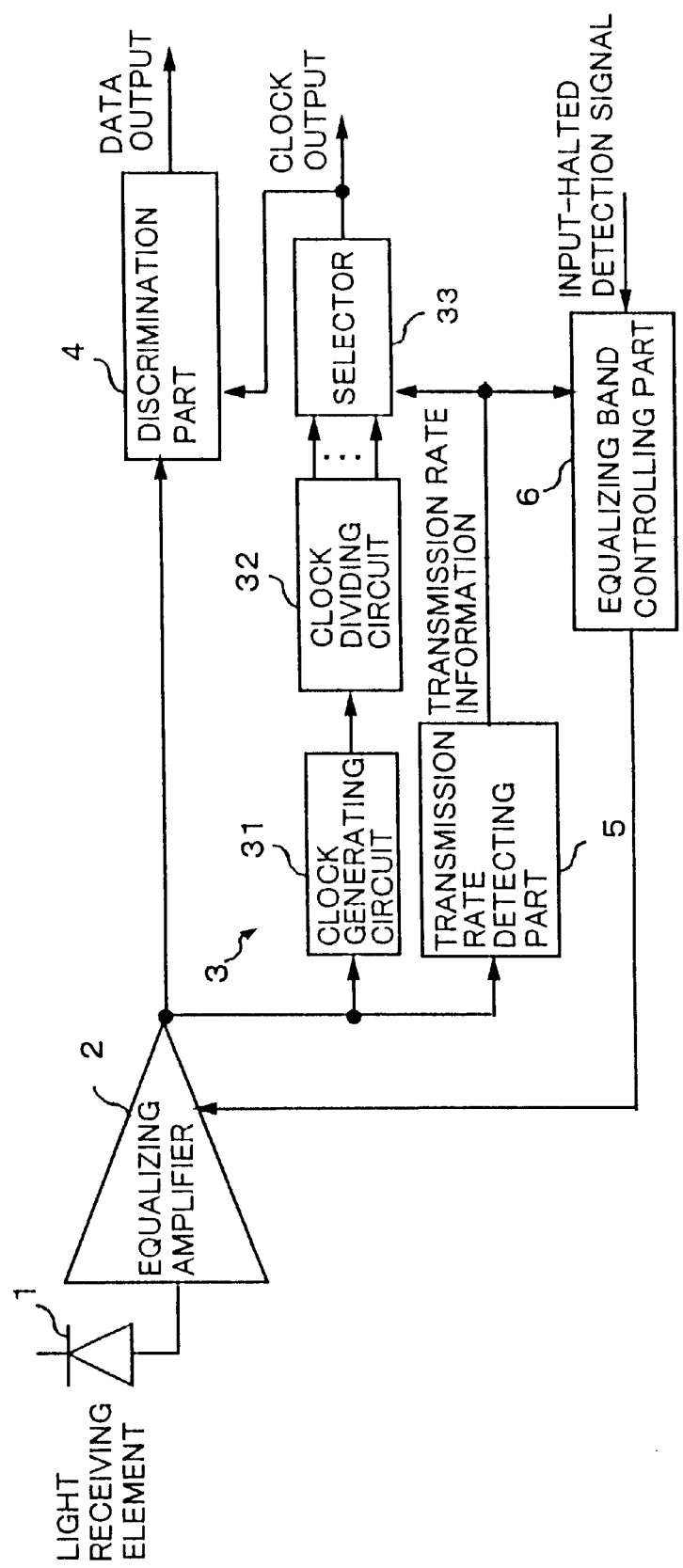
FIG. 1 is a block diagram showing a constitution of a first embodiment according to the present invention.

FIG. 1 is a block diagram showing a constitution of an optical receiving apparatus according to a first embodiment of the present invention.

In FIG. 1, the present optical receiving apparatus is constituted such as of: a light receiving element 1 for converting a received signal light into an electric signal; an equalizing amplifier 2, as equalizing-amplifying device, input with the electric signal from the light receiving element 1 to amplify the same; a clock regenerating part 3, as clock regenerating device, for regenerating a clock signal based on the signal amplified at the equalizing amplifier 2; a discrimination part 4 for performing a data discrimination processing on the signal from the equalizing amplifier 2; a transmission rate detecting part 5, as transmission rate detecting device, for detecting a transmission rate of the received signal based on the signal from the equalizing amplifier 2; and an equalizing band controlling part 6, as equalizing-amplification controlling device, for controlling the equalizing band of the equalizing amplifier 2 corresponding to the transmission rate detected at the transmission rate detecting part 5 and an input-halted detection signal as a rate-change signal. Here, it is assumed that the present optical receiving device receives a wavelength-division multiplexing signal light which is obtained by multiplexing a plurality of signal lights having different wavelengths. The transmission rates of the received signal lights differ from one another depending on the wavelengths, and these rates are assumed to include such as 622 Mb/s, 2.5 Gb/s, and 10 Gb/s, here.

The light receiving element 1 is assumed to be such as an avalanche photodiode or PIN photodiode of which response speed is arranged to match with the fastest transmission rate, i.e. 10 Gbps. It is, of course, arranged to match with each of the transmission rates of the received signal lights.

The equalizing amplifier 2 is an electric amplifier such as preamplifier or postamplifier, for linearly amplifying the received signal which has been photoelectrically converted by the light receiving element 1. This equalizing amplifier 2 is capable of changing its equalizing band, in response to the signal from the equalizing band controlling part 6. It is assumed that when its equalizing band is maximized, a signal at a rate of 10 Gb/s can be amplified without distortion.

The clock regenerating part 3 is constituted such as of a clock generating circuit 31, a clock dividing circuit 32, and a selector 33. Based on the signal output from the equalizing amplifier 2, the clock generating circuit 31 generates a clock signal corresponding to the fastest transmission rate, 10 Gb/s here. This clock generating circuit 31 is constituted such as of a known phase-locked loop (PLL) circuit. The clock dividing circuit 32 generates clock signals corresponding to the applicable transmission rates, respectively, by dividing the clock signal from the clock generating circuit 31. Here, clock signals of 622 Mb/s, 2.5 Gb/s, and 10 Gb/s are output from the clock dividing circuit 32. The selector 33 selects and outputs one of those clock signals supplied from the clock dividing circuit 32, which corresponds to the transmission rate detected at the transmission rate detecting part 5. The thus selected clock signal is output to the external as a clock output from the present optical receiving apparatus, and also fed to the discrimination part 4.

The discrimination part 4 performs a data discrimination processing onto the received signal from the equalizing amplifier 2, making use of the clock signal from the clock regenerating part 3. The discrimination result is output to the external as a data output from the present optical receiving apparatus.

Figure 2:
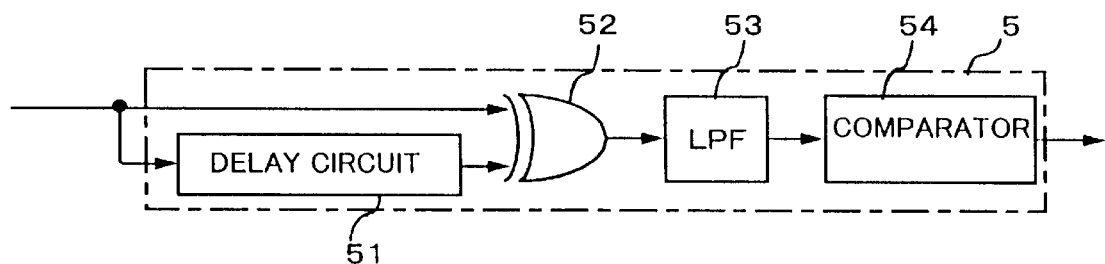
FIG. 2 is a block diagram showing a constitutional example of a transmission rate detecting part in the first embodiment.

Based on the signal from the equalizing amplifier 2, the transmission rate detecting part 5 judges the transmission rate of the received signal light, such as by means of a circuit shown in FIG. 2. The circuit of FIG. 2 is constituted of: a delay circuit 51 for delaying the signal from the equalizing amplifier 2 for a predetermined period of time; an exclusive OR circuit 52 for calculating an exclusive OR of the signals from the equalizing amplifier 2 and from the delay circuit 51; a low-pass filter (LPF) 53 input with the calculation result of the exclusive OR circuit 52; and a comparator 54 for comparing the signal passed through the low-pass filter 53 with a reference value. The detection result at the transmission rate detecting part 5 is sent to the selector 33 and equalizing band controlling part 6, as transmission rate information.

The transmission rate detecting part 5 is not restricted to the above described circuit configuration. For example, it is possible to adopt the aforementioned known conventional technique for detecting a transmission rate.

The equalizing band controlling part 6 receives such as an input-halted detection signal, and outputs a control signal for maximizing the equalizing band, to the equalizing amplifier 2. This input-halted detection signal is fed from an input-halted detection circuit (not shown). This input-halted detection circuit has been provided in a conventional optical receiving apparatus, in which the input-halting (a state where receiving of a signal light is stopped) is detected by monitoring the state of the received signal. It is believed that the input-halted state should exist in the course of change of the transmission rate of the received signal light (transmission rate V1→input-halted→transmission rate V2). Further, the equalizing band controlling part 6 is adapted to output a control signal for changing the equalizing band of equalizing amplifier 2 to the band which is matched with the transmission rate information, when the equalizing band controlling part 6 is supplied with new transmission rate information from the transmission rate detecting part 5.

There will be described hereinafter the operation of the first embodiment.

There will be mainly described the operation where the change of transmission rate of the received signal light has occurred. Upon occurrence of the change of transmission rate, as described above, the reception of signal light is once halted, so that the input-halted detection signal is generated and sent to the equalizing band controlling part 6. The equalizing band controlling part 6 receives this input-halted detection signal and sends the control signal to the equalizing amplifier 2 to thereby control its equalizing band to be the maximum. It is noted that the equalizing band before the occurrence of change of transmission rate has been controlled to be optimal for the transmission rate at that time. Concretely, the equalizing band is set to be approximately 0.6 to 0.8 times as fast as the transmission rate.

The reason, why the equalizing band is maximized at the change of transmission rate, is to avoid that the received signal is restricted by the band width limitation at the equalizing amplifier 2. For example, if the equalizing band is kept at a state corresponding to a lower transmission rate even when the transmission rate has changed from a lower rate to a higher rate, the band at the equalizing amplifier 2 becomes insufficient for linearly amplifying the signal light of higher rate. If the transmission rate is detected at the transmission rate detecting part 5 based on the signal from the equalizing amplifier 2 where the band is insufficient, the detected transmission rate may be erroneous. Nonetheless, if the equalizing band is maximized upon change of the transmission rate, the band of equalizing amplifier 2 is sufficiently maintained no matter whatever transmission rate of signal light is received. Thus, the transmission rate detecting part 5 can correctly detect the transmission rate. Relationally upon changing to a slower transmission rate, the signal is amplified within an equalizing band more than required so that the influence of noises at the equalizing amplifier 2 is increased. Nonetheless, the operation of the transmission rate detecting part 5 is rarely affected.

When the transmission rate detecting part 5 detects the transmission rate after changing, the information of transmission rate is sent to the equalizing band controlling part 6 and to the selector 33. The equalizing band controlling part 6 controls the band of the equalizing amplifier 2 to become an equalizing band corresponding to the detected transmission rate. Thus, the received signal is linearly amplified at the equalizing amplifier 2 and thereafter sent to the clock regenerating part 3 and discrimination part 4, in which the equalizing amplifier 2 has been adjusted to the optimal equalizing band. Based on this signal, there is regenerated a clock signal at the clock generating circuit 31, which is then divided at the clock dividing circuit 32, and thereafter the selector 33 selects the clock signal which is matched with the transmission rate. Making use of the thus selected clock signal, the signal from the equalizing amplifier 2 is discriminated at the discrimination part 4.

In the first embodiment, the band of equalizing amplifier 2 is maximized in response to the occurrence of the input-halted detection signal at the change of transmission rate, as described above. Thus, the transmission rate can be assuredly detected no matter how the transmission rate is varied after the change. In addition, the band of equalizing amplifier 2 is optimized corresponding to the detected transmission rate, so that the reception characteristics will be never deteriorated due to the change of transmission rate of signal light. Thus, it becomes possible to receive and process the signal lights having different transmission rates, with accuracy.

In the first embodiment, it has been explained that the equalizing band is maximized based on the input-halting upon changing of transmission rate. However, the present invention is not limited thereto. For example, it is possible to control the equalizing band based on the change of output of the transmission rate detecting part 5 following the change of transmission rate. At the transmission rate detecting part 5, the transmission rate cannot be correctly detected, if the signal from the equalizing amplifier 2 is restricted by the band limitation when the transmission rate has changed from a lower rate to a higher rate. Nonetheless, even in this case, the output of the transmission rate detecting part 5 presents changing as the input signal is changed. In the circuit concretely shown in FIG. 2, the output of transmission rate detecting part 5 has a value close to a low level during reception of a signal light of lower rate. When a signal of higher rate is input in this state, the waveform of input into the exclusive OR circuit 52 deviates from a normal shape. Thus, the interrelation between two input signals is weakened, so that the output is changed into a direction approaching a high level. By detecting this change so as to establish the maximum equalizing band, the transmission rate can be correctly detected thereafter.

It is also possible to control the equalizing band such as based on the operation of the discrimination part 4 upon changing of the transmission rate. After the transmission rate has been changed so that the equalizing band deviates from the optimal state, there will occur such as error of received data and outing of synchronism. Thus, by monitoring that, it becomes possible to detect the change of the transmission rate to thereby set the maximum equalizing band.

Figure 3:
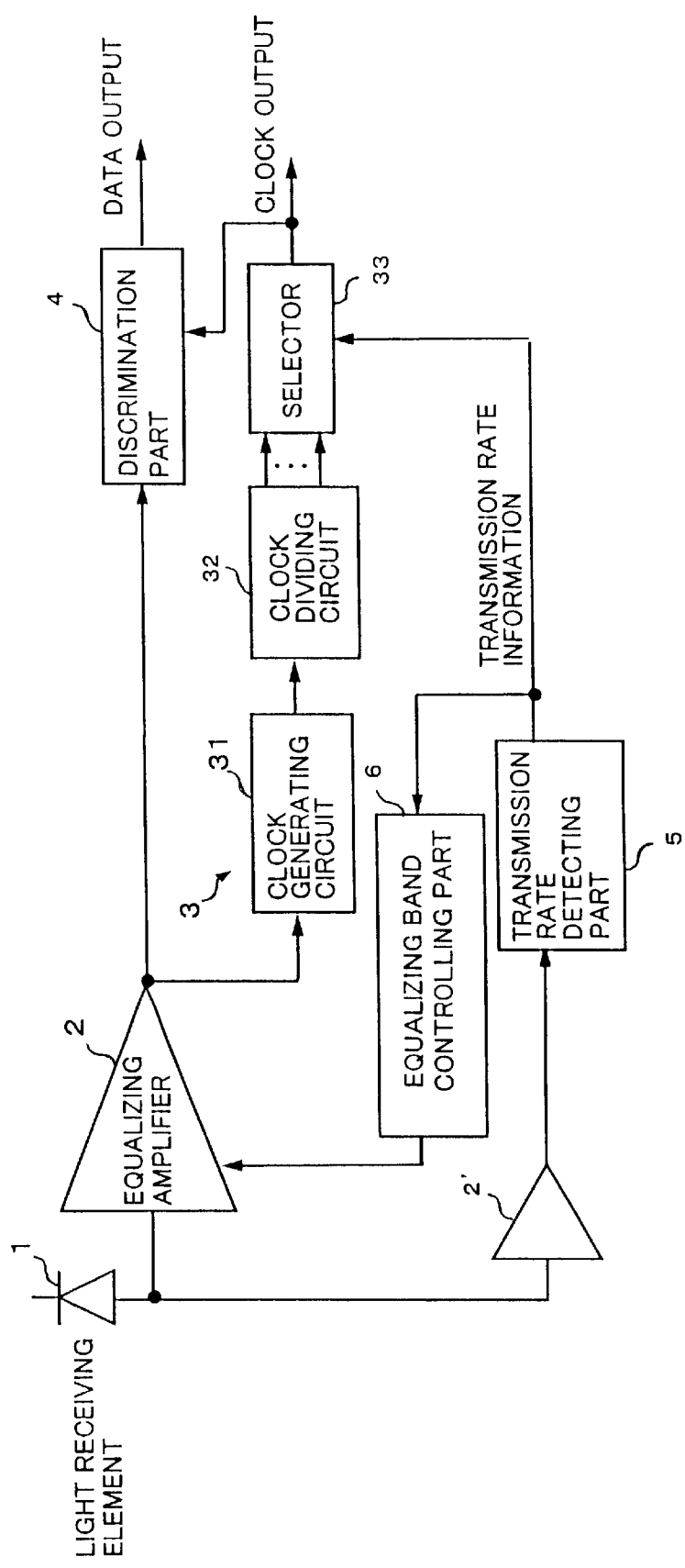
FIG. 3 is a block diagram showing another constitutional example of an optical receiving apparatus of the first embodiment.

Further, in the first embodiment as described above, the transmission rate detecting part 5 is constituted to detect the transmission rate, making use of the signal from the equalizing amplifier 2. However, as shown in FIG. 3, it is possible to provide, separately from the equalizing amplifier 2, an amplifier 2' for amplifying the signal from the light receiving element 1, and the transmission rate detecting part 5 is constituted to detect the transmission rate making use of a signal from the amplifier 2'. In this case, the amplifier 2' is assumed to have a fixed band corresponding to the higher transmission rate. According to such a constitution, the transmission rate can be detected without any band limitation at the equalizing amplifier 2. Thus, it becomes possible to control the equalizing band based on the change of transmission rate which is detected by the transmission rate detecting part 5, without operating the equalizing band controlling part 6 based on information such as the aforementioned input-halting information.

There will be described hereinafter a second embodiment.

In this embodiment, the transmission rate detecting part is enabled to detect the transmission rate of the received signal light, in a manner free from the affection of the change of the equalizing band.

Figure 4:
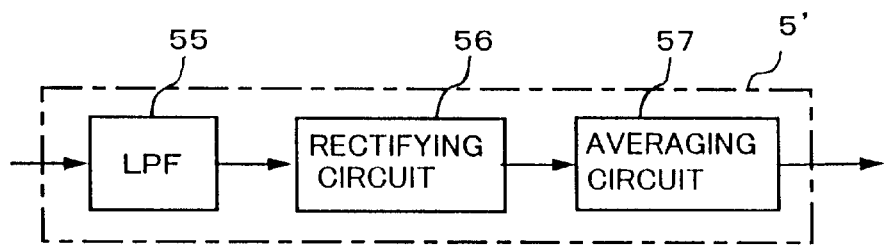
FIG. 4 is a block diagram showing a constitution of a transmission rate detecting part adopted in a second embodiment according to the present invention.

Shown in FIG. 4 is a block diagram of a constitution of the transmission rate detecting part to be adopted in the second embodiment. The constitutional elements other than the transmission rate detecting part are identical with those in the first embodiment shown in FIG. 1.

In FIG. 4, the present transmission rate detecting part 5' is constituted of: a low-pass filter (LPF) 55 as a filter part input with the signal from the equalizing amplifier 2; a rectifying circuit 56 as a rectifying part for rectifying the signal which has passed through the low-pass filter 55; and an averaging circuit 57 as an averaging part for averaging the level of signal output from the rectifying circuit 56.

The low-pass filter 55 has a band which is narrower than the narrowest band which can be set as the equalizing band for the equalizing amplifier 2. Here, the band of low-pass filter 55 is set to be such as in the order of 300 Mb/s, so that this band is narrower than the equalizing band to be set in response to the signal light of 622 Mb/s. The rectifying circuit 56 may be a known half-wave rectifying circuit or full-wave rectifying circuit, which rectifies the signal passed through the low-pass filter 55 and outputs to the averaging circuit 57. The averaging circuit 57: obtains an averaged value of the output level of signal rectified by the rectifying circuit 56; judges the transmission rate of the received signal light, based on the averaged value; and outputs the result of judgment, as transmission rate information.

There will be explained the operation of the transmission rate detecting part 5' having such a constitution described above.

Firstly, the signal from the equalizing amplifier 2 is input to the low-pass filter 55. This signal passes through the low-pass filter 55 the band of which is narrower than the equalizing band of equalizing amplifier 2, so that the output amplitude of this signal is decreased due to the band limitation. The higher the transmission rate of the signal is, the larger the influence of the band limitation of low-pass filter 55 is. In this context, the output amplitude becomes smallest when the signal has the transmission rate of 10 Gb/s. Thus, there is generated a signal having an output amplitude corresponding to the transmission rate of received signal light, by passing the signal from equalizing amplifier 2 through the low-pass filter 55, as described above. Then, the signal passed through the low-pass filter 55 is sent to the rectifying circuit 56 where this signal is rectified and then output.

Figure 5:
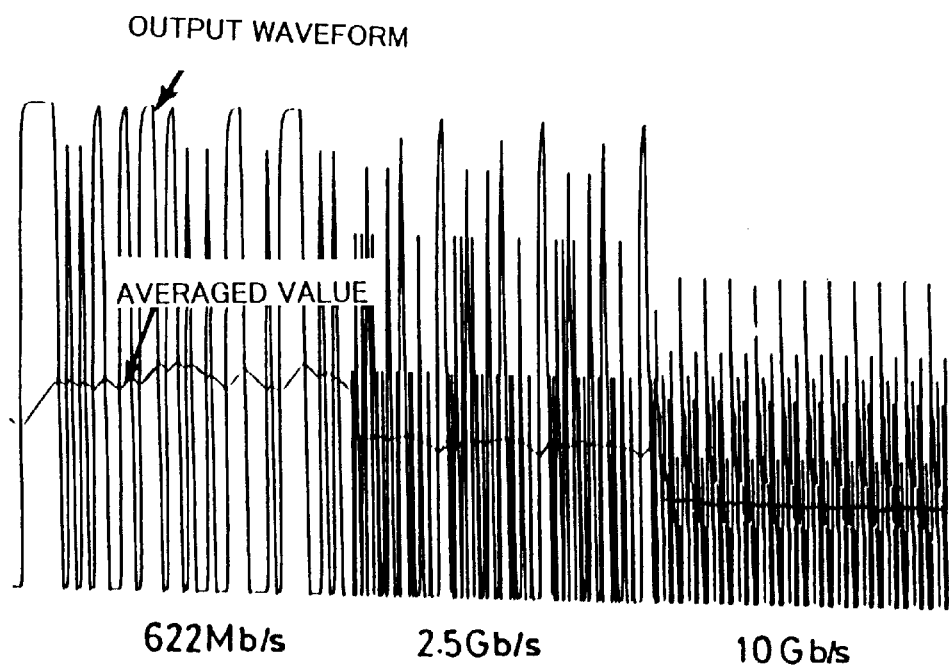
FIG. 5 is a diagram showing a simulation result of a signal waveform at the transmission rate detecting part of the second embodiment.

FIG. 5 shows a result where the waveform of amplitude of output signal of rectifying circuit 56 is simulated for each of the transmission rates. As seen from FIG. 5, the faster the transmission rate is in the order of 622 Mb/s, 2.5 Gb/s, and 10 Gb/s, the smaller the amplitude of output after rectification is. It is noted that FIG. 5 shows waveforms in case that the signal passed through the low-pass filter 55 is half-wave rectified. If full-wave rectified, the differences between the signal amplitudes of the respective transmission rates should become larger.

Then, the signal rectified at the rectifying circuit 56 is sent to the averaging circuit 57 to obtain an averaged value of the signal level, as shown in FIG. 5. As seen, there are obtained different averaged values depending on the transmission rates, respectively. Thus, the transmission rate can be detected such as making use of the difference between respective averaged values. Concretely, the transmission rate is detected by judging as to which of the reference values previously set for respective changing phenomena, the difference between the averaged values at the time of changing of transmission rate corresponds to. The thus detected result as transmission rate information is sent to the equalizing band controlling part and the selector 33, similarly to the first embodiment.

According to the second embodiment, by adopting the transmission rate detecting part 5', the transmission rate of received signal light can be detected without influence even when the band of the equalizing amplifier 2 is changed.

It is noted that the second embodiment is constituted such that the band of equalizing amplifier 2 is maximized based on the input-halting at the time of changing of transmission rate, not necessary to be the transmission rate detecting part 5' is capable of detecting the transmission rate, independently of the equalizing band, and thus, without maximizing the equalizing band based on the input-halting, the equalizing band may be controlled in accordance with the detected transmission rate. However, it is noted that the operations of the respective parts just after the change are more stabilized, by once maximizing the equalizing band at the time of changing of transmission rate.

Next, there will be described a third embodiment.

In the third embodiment, there will be explained such a situation that the band of a loop filter adopted in a PLL (phase-locked loop) circuit is controlled corresponding to the transmission rate, in case that the clock generating circuit 31 in the first embodiment is realized by the PLL circuit.

Figure 6:
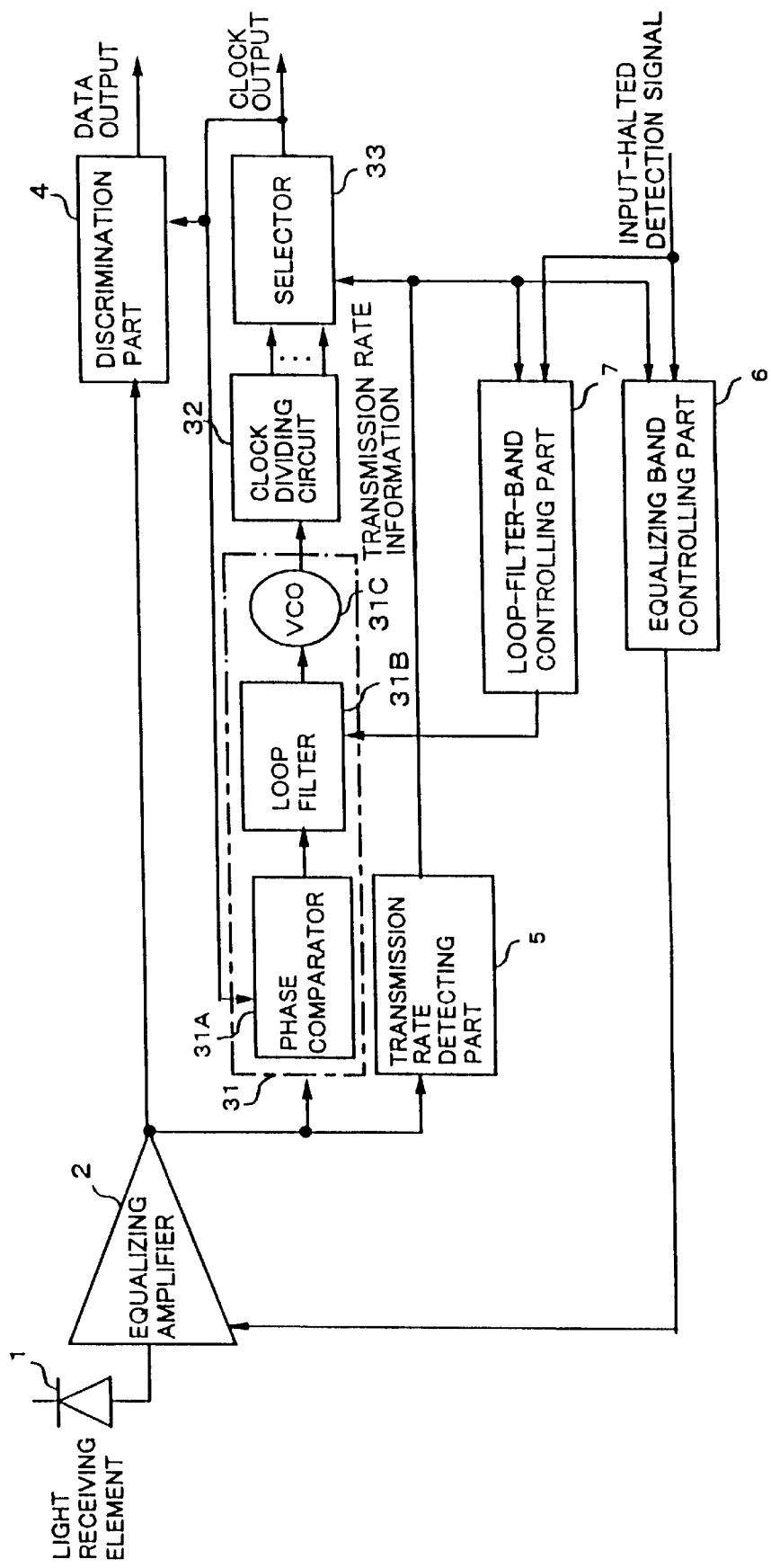
FIG. 6 is a block diagram showing a constitution of a third embodiment according to the present invention.

FIG. 6 is a block diagram showing a constitution of optical receiving apparatus according to the third embodiment. Like reference numerals as used in FIG. 1 are used to denote corresponding or identical elements in FIG. 6 and the explanation is omitted.

In FIG. 6, the constitution of this optical receiving apparatus differs from that of the first embodiment, in that the clock generating circuit 31 is concretely constituted of a phase comparator 31A, a loop filter 31B and voltage controlled oscillator (VCO) 31C, and there is provided a loop-filter-band controlling part 7 as clock regeneration controlling device for controlling the band of the loop filter 31B, in a manner corresponding to the transmission rate. Those parts other than what is described just above are identical with those of the first embodiment.

The phase comparator 31 A outputs an error signal proportional to the phase difference between the signal from equalizing amplifier 2 and the clock signal output from the selector 33. The loop filter 31B is provided for extracting a necessary signal component from the error signal from the phase comparator 31A, and the band of the loop filter 31B is assumed to be variable in response to the control signal from the loop-filter-band controlling part 7. The voltage controlled oscillator 31C generates an oscillation output having a specific oscillation frequency at the time of initial operation, and when a signal which has passed through the loop filter 31B is input, the frequency of the oscillation output is varied corresponding to the signal. The loop filter 31B is identical with a common PLL circuit, except that its band is controlled.

The clock signal output from the selector 33 has a center frequency which is varied in response to the change of transmission rate of the received signal. If the clock signal band is kept constant even when the transmission rate has been changed, Q of the clock signal will vary to affect such as jitter. To keep Q of the clock signal substantially constant, it is necessary to adjust the band of the loop filter 31B corresponding to the change of transmission rate. For example, the center frequency of clock signal becomes smaller when the transmission rate has been changed to a lower rate, so that it is necessary to narrow the band of the loop filter 31B in a corresponded manner. However, if the band of the loop filter 31B is narrowed, the response of PLL circuit is delayed and its pull-in time is prolonged, resulting in that the time required for locking at a fixed frequency is prolonged.

As such, in this embodiment, when the transmission rate has been changed, an input-halted detection signal is sent to the loop-filter-band controlling part 7 which in turn sends a control signal to the loop filter 31B for maximizing the band thereof. By virtue of this control signal, the band at loop filter 31B is set at the maximum so that the PLL circuit operates at the fastest response speed (pull-in time) for thereby locking in a short time. Concurrently, the transmission rate is detected at the transmission rate detecting part 5, and the transmission rate information is sent to the loop-filter-band controlling part 7. This loop-filter-band controlling part 7 controls the band of the loop filter 31B to be matched with the transmission rate information so that the Q of clock signal to be regenerated is kept substantially constant.

According to the third embodiment as described above, the band of the loop filter 31B of clock generating circuit 31 adopting the PLL circuit is controlled by the loop-filter-band controlling part 7 in a manner corresponding to the change of transmission rate. Thus, even when different transmission rate signal lights are received, there can be regenerated a stable clock signal in a short time.

Figure 7:
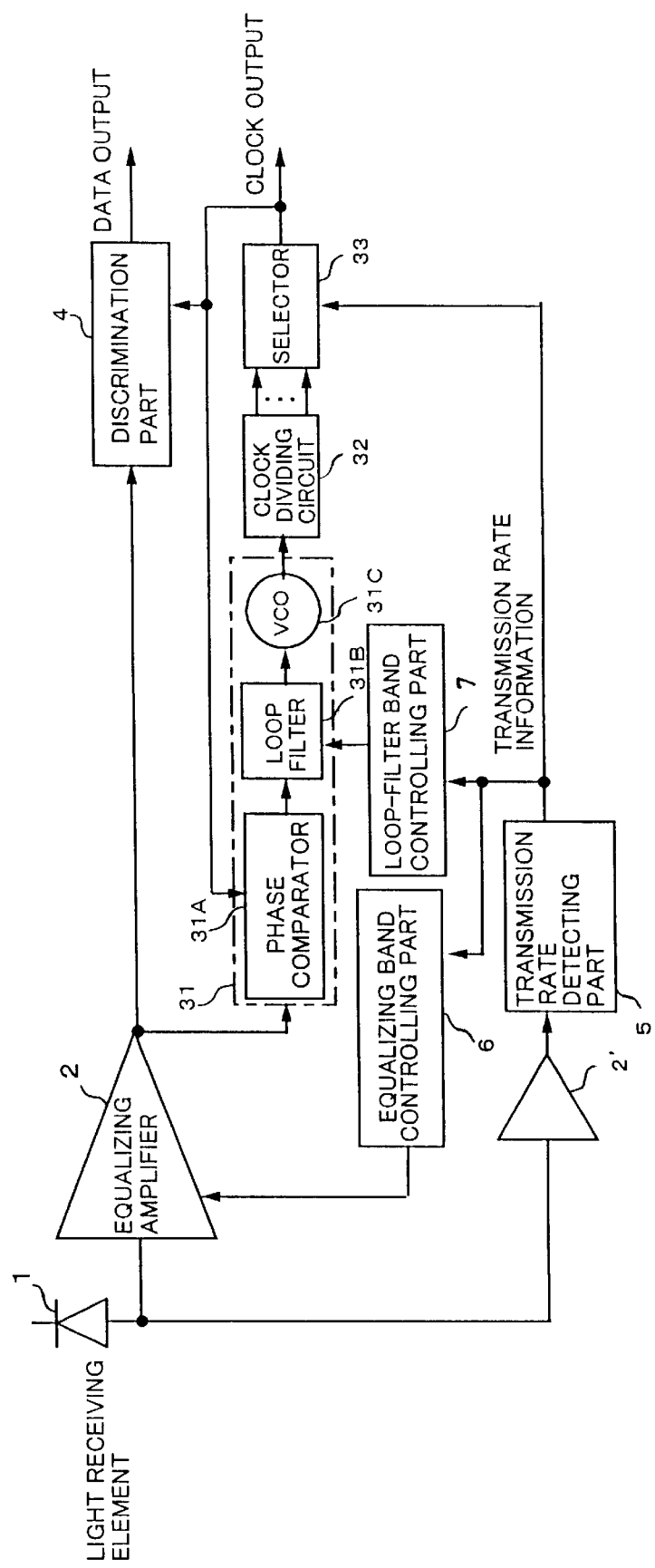
FIG. 7 is a block diagram showing another constitutional example of the third embodiment.

In the third embodiment, the band of the loop filter 31B is maximized based on the input-halted detection signal at the time of changing of transmission rate. However, the present invention is not restricted thereto. Namely, the band of the loop filter 31B may be maximized, such as based on the change of output of transmission rate detecting part 5 at the time of changing of transmission rate, error of received data or outing of synchronism. Further, the band of the loop filter 31B may be controlled in the optical receiving apparatus having the constitution shown in FIG. 3, in a manner similar to what is shown in FIG. 3. The constitution in this case is simply shown in FIG. 7. It is also possible to utilize the transmission rate detecting part 5' adopted in the second embodiment, instead of the transmission rate detecting part 5.

There will be described a fourth embodiment hereinafter.

In the fourth embodiment, there will be explained such a situation that the voltage controlled oscillator 31C in the third embodiment is substituted by a voltage controlled oscillator, the oscillation frequency of which is variable over a wide range.

Figure 8:
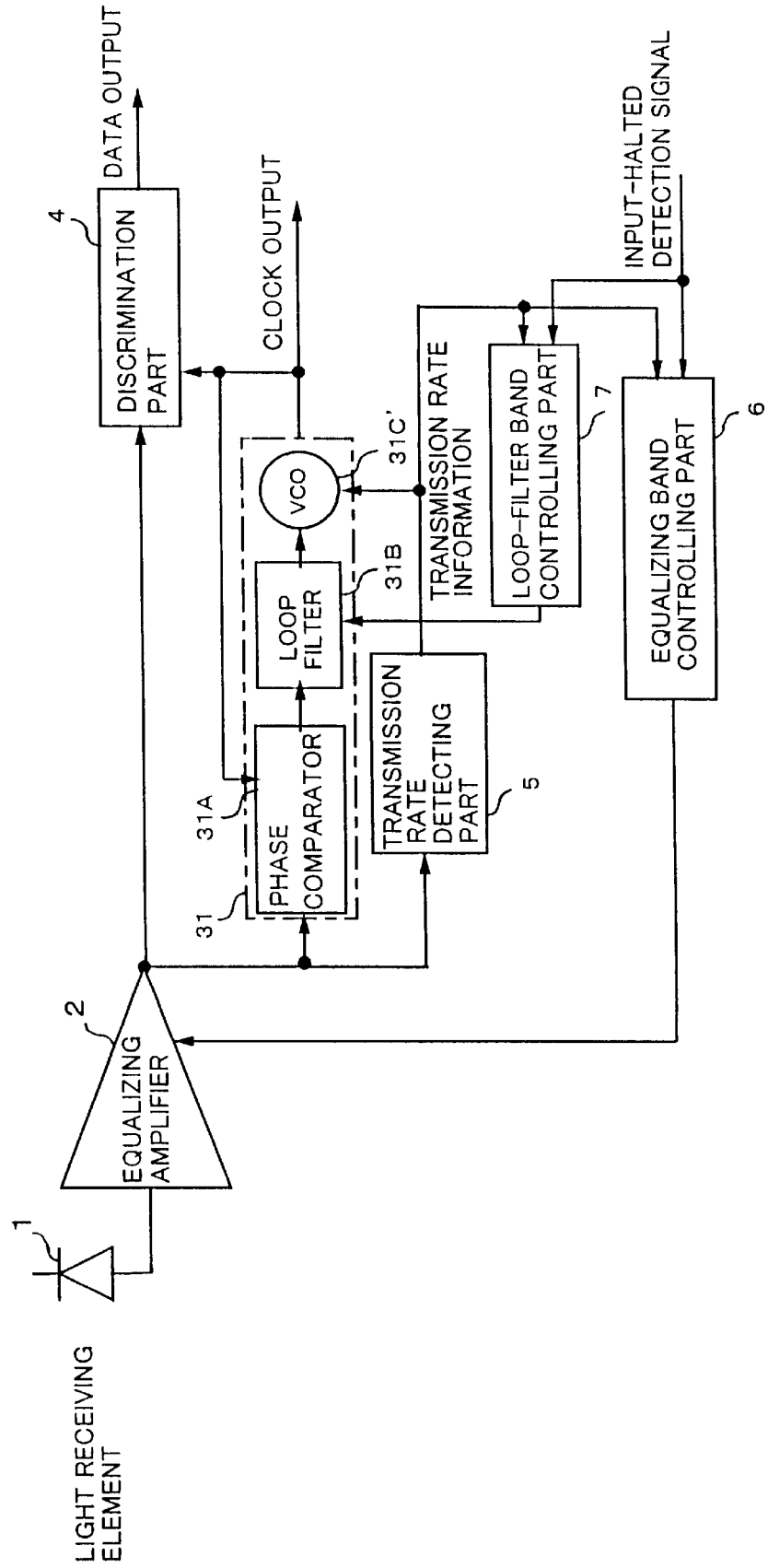
FIG. 8 is a block diagram showing a constitution of a fourth embodiment according to the present invention.

FIG. 8 is a block diagram showing the constitution of optical receiving apparatus according to the fourth embodiment.

In FIG. 8, the constitution of this optical receiving apparatus differs from that of the third embodiment, in that there is adopted a voltage controlled oscillator 31C' as a voltage control oscillating part which is adapted to vary its oscillation frequency in response to the transmission rate information, to thereby constitute the clock generating circuit 31, so that the clock dividing circuit 32 and selector 33 of the third embodiment are omitted. Those parts other than what is described just above are identical with those of the third embodiment.

The voltage controlled oscillator 31C' is capable of generating oscillation signals having oscillation frequencies in response to each of the transmission rates, respectively, and the approximated setting of the oscillation frequency is performed based on the transmission rate information. The oscillation signal from this voltage controlled oscillator 31C' is output to the external of this optical receiving apparatus as a clock signal, and is sent to the discrimination part 4 and phase comparator 31A.

In the optical receiving apparatus having such a constitution, the equalizing band controlling part 6 and the loop-filter-band controlling part 7 maximize the bands of the equalizing amplifier 2 and the loop filter 31B, respectively, based on the input-halted detection signal at the time of changing of transmission rate of the received signal light. When the transmission rate after the change is detected at the transmission rate detecting part 5, the transmission rate information is sent to the voltage controlled oscillator 31C' to thereby set the oscillation frequency of voltage controlled oscillator 31C' based on this transmission rate information. The oscillation frequency set at this time is an approximate frequency corresponding to the detected transmission rate, and the fine tuning of the oscillation frequency is conducted on the basis of this oscillation frequency by the PLL circuit. When the frequency of the clock signal is substantially fixed so that the PLL circuit has locked, the band of the loop filter 31B is set at a value corresponding to the transmission rate by the loop-filter-band controlling part 7. Here, as to whether the PLL circuit has locked or not is judged such as based on: that the output signal (not shown) of the phase comparator 31A becomes to show a phase difference of zero or that a predetermined period of time has lapsed after the approximated value of the oscillation frequency was established. By setting the band of the loop filter 31B at an optimal value, the voltage controlled oscillator 31C' outputs a stable clock signal.

According to the fourth embodiment as described above, there is adopted the voltage controlled oscillator 31C' the oscillation frequency of which can be varied over a wide range, and the oscillation frequency of this voltage controlled oscillator 31C' is controlled in a manner corresponding to the transmission rate of the received signal. Thus, there can be regenerated stable clock signals corresponding to each of the transmission rates, respectively, by the clock regenerating part 3 which has such a simple constitution that the clock dividing circuit 32 and selector 33 are omitted.

Also in the fourth embodiment, it is constituted that the change of the transmission rate is judged based on the input-halted detection signal. However, without limited thereto, it is possible to judge the change of the transmission rate, such as based on the change of output of transmission rate detecting part 5; error of received data or outing of synchronism. Further, also in the optical receiving apparatus having a constitution shown in FIG. 7, it is possible to simplify the constitution of clock regenerating part 3, similarly to the fourth embodiment. Further, instead of the transmission rate detecting part 5, it is possible to adopt the transmission rate detecting part 5' according to the second embodiment.

In the above described embodiments, there have been explained about a case where the transmission rate of the signal light is one of 622 Mb/s, 2.5 Gb/s, and 10 Gb/s. However, the present invention is not limited to such transmission rate and to the number thereof.

What we claimed are:

1. An optical receiving apparatus comprising:
   a light receiving element for receiving each of signal light having different transmission rates and for converting said received signal light into an electric signal;
   equalizing-amplifying means having a variable band, for linearly amplifying said electric signal from said light receiving element;
   transmission rate detecting means for detecting a transmission rate of said received signal light and generating a rate-change signal when the transmission rate of said received signal light changes; and
   equalizing-amplification controlling means for controlling said band of said equalizing-amplifying means, corresponding to said transmission rate detected by said transmission rate detecting means, wherein
   said equalizing amplification controlling means comprises:
     means for controlling said band of said equalizing-amplifying means to be a maximum value of said band, when the rate-change signal is generated; and
     means for, on and after the transmission rate after changing has been detected by said transmission rate detecting means, controlling said band of said equalizing-amplifying means to be an optimal value corresponding to said detected transmission rate.

2. An optical receiving apparatus of claim 1, wherein said rate-change signal is generated based on halting of the reception of signal light.

3. An optical receiving apparatus of claim 1, wherein said rate-change signal is generated based on change of the output of said transmission rate detecting means.

4. An optical receiving apparatus of claim 1, wherein said rate-change signal is generated based on either of a code error or outing of synchronism, in a discrimination processing of the received signal.

5. An optical receiving apparatus of claim 1, wherein said transmission rate detecting means comprises a filtering part, a rectifying part, and an averaging part;

said filtering part for receiving, as an input signal, a signal from said equalizing-amplifying means, said filtering part having a band narrower than the minimum band of said equalizing-amplifying means, said rectifying part for rectifying a signal passed through said filtering part, and said averaging part for obtaining an averaged value of level of a signal rectified by said rectifying part, so that said transmission rate detecting means detects a transmission rate of the received signal light based on said averaged value.

6. An optical receiving apparatus comprising:

a light receiving element for receiving each of signal light having different transmission rates and for converting said received signal light into an electric signal;

equalizing-amplifying means having a variable band, for linearly amplifying said electric signal from said light receiving element;

transmission rate detecting means for detecting a transmission rate of said received signal light and generating a rate-change signal when the transmission rate of said received signal light changes;

equalizing-amplification controlling means for controlling said band of said equalizing-amplifying means, corresponding to said transmission rate detected by said transmission rate detecting means;

clock regenerating means for regenerating a clock signal based on a signal from said equalizing-amplifying means, making use of a phase-locked loop circuit having a loop filter having a variable band; and clock regeneration controlling means for controlling a band of said loop filter corresponding to the transmission rate detected by said transmission rate detecting means, wherein, said clock regeneration controlling means comprises:

means for controlling said band of said loop filter to be a maximum value of said band, when the rate-change signal is generated; and means for, on and after the transmission rate after changing has been detected by said transmission rate detecting means, controlling said band of said loop filter to be an optimal value corresponding to said detected transmission rate.

7. An optical receiving apparatus of claim 6, wherein said clock regeneration controlling means comprises:

means for controlling said band of said loop filter to be a maximum, when received a rate change signal indicating that the transmission rate of said received signal light has been changed; and means for, on and after the transmission rate after changing has been detected by said transmission rate detecting means, controlling said band of said loop filter to be an optimal value corresponding to said detected transmission rate.

8. An optical receiving apparatus of claim 6, wherein said phase-locked loop circuit includes a voltage controlled oscillating part which is capable of generating oscillation signals at frequencies corresponding to different transmission rates, respectively, and said clock regeneration controlling means comprises means for controlling the oscillation frequency of said voltage controlled oscillating part, in a manner corresponding to the transmission rate detected by said transmission rate detecting means.

9. An optical receiving method comprising the steps of:

receiving each of signal lights having different transmission rates and converting said received signal light into an electric signal;

detecting a transmission rate of said received signal light and generating a rate-change signal when the transmission rate of said received signal light changes;

equalizing-amplification-controlling a variable band of equalizing amplifying means which linearly amplifies said converted electric signal;

regenerating a clock signal based on the signal linearly amplified by said equalizing-amplifying means, making use of a phase-locked loop circuit having a loop filter having a variable band; and controlling a band of said loop filter corresponding to said detected transmission rate, wherein said controlling step comprises:

controlling said band of said loop filter to be a maximum value of said band, when the rate-change signal is generated; and controlling, on and after the transmission rate after changing has been detected, said band of said loop filter to be an optimal value corresponding to said detected transmission rate.

10. An apparatus comprising:

an equalizing-amplifying device having a band and linearly amplifying an electrical signal converted from a received signal light;

a clock regenerating device regenerating a clock signal based on a signal from said equalizing-amplifying device, making use of a phase-locked loop circuit having a loop filter having a band; and a controlling device controlling the band of said loop filter to correspond to a detected transmission rate of the received signal light, wherein said controlling device comprises:

a first controlling device controlling said band of said loop filter to be a maximum value of said band, when a rate-change signal is generated to indicate that the detected transmission rate of said received signal light has been changed; and a second controlling device controlling, on and after the transmission rate after changing has been detected, said band of said loop filter to be an optimal value corresponding to said detected transmission rate.

* * * * *